US009280386B1

(12) United States Patent
Hagmann et al.

(10) Patent No.: US 9,280,386 B1
(45) Date of Patent: Mar. 8, 2016

(54) IDENTIFYING TASK INSTANCE OUTLIERS BASED ON METRIC DATA IN A LARGE SCALE PARALLEL PROCESSING SYSTEM

(75) Inventors: Robert Hagmann, Palo Alto, CA (US); Xiao Zhang, Mountain View, CA (US); Eric S. Tune, Saratoga, CA (US); Vrijendra Gokhale, Cupertino, CA (US)

(73) Assignee: Google Inc., Mountain View, CA (US)

( * ) Notice: Subject to any disclaimer, the term of this patent is extended or adjusted under 35 U.S.C. 154(b) by 955 days.

(21) Appl. No.: 13/183,234

(22) Filed: Jul. 14, 2011

(51) Int. Cl.
G06F 9/46 (2006.01)
G06F 9/48 (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,496,848 | B1 * | 12/2002 | Nankaku | 718/100 |
| 6,546,364 | B1 * | 4/2003 | Smirnov et al. | 703/22 |
| 8,250,131 | B1 * | 8/2012 | Pulsipher | 709/201 |
| 8,413,103 | B2 | 4/2013 | Potemski et al. | |
| 8,429,187 | B2 | 4/2013 | Theimer et al. | |
| 8,488,873 | B2 | 7/2013 | Rousson et al. | |
| 2004/0205206 | A1 * | 10/2004 | Naik et al. | 709/230 |
| 2006/0059491 | A1 * | 3/2006 | Suzuki et al. | 718/100 |
| 2006/0195508 | A1 * | 8/2006 | Bernardin et al. | 709/203 |
| 2006/0200546 | A9 * | 9/2006 | Bailey et al. | 709/224 |
| 2007/0067145 | A1 * | 3/2007 | Miller et al. | 703/6 |
| 2007/0216698 | A1 * | 9/2007 | Devore et al. | 345/545 |
| 2007/0266385 | A1 * | 11/2007 | Flautner et al. | 718/102 |
| 2008/0016412 | A1 * | 1/2008 | White et al. | 714/48 |
| 2008/0306711 | A1 * | 12/2008 | Bansal | 702/182 |
| 2009/0089139 | A1 * | 4/2009 | Rojas-Cessa et al. | 705/9 |
| 2009/0281865 | A1 * | 11/2009 | Stoitsev | 705/9 |
| 2010/0174436 | A1 * | 7/2010 | Matsunaga | 701/26 |
| 2010/0198776 | A1 * | 8/2010 | Wang et al. | 706/58 |
| 2011/0013845 | A1 * | 1/2011 | Tu et al. | 382/218 |
| 2011/0047554 | A1 * | 2/2011 | Lakshmanan et al. | 718/105 |
| 2011/0078426 | A1 * | 3/2011 | Stoitsev | 712/244 |
| 2012/0066683 | A1 * | 3/2012 | Srinath | 718/102 |
| 2012/0089724 | A1 * | 4/2012 | Liang et al. | 709/224 |
| 2012/0167101 | A1 * | 6/2012 | Kandula et al. | 718/102 |
| 2012/0179640 | A1 * | 7/2012 | Sherry et al. | 706/52 |
| 2012/0317580 | A1 * | 12/2012 | Catterall et al. | 718/104 |

FOREIGN PATENT DOCUMENTS

| | | |
|---|---|---|
| WO | WO 01/93043 | 12/2001 |
| WO | WO 2012/151585 | 11/2012 |

* cited by examiner

*Primary Examiner* — Emerson Puente
*Assistant Examiner* — Mehran Kamran
(74) *Attorney, Agent, or Firm* — Fish & Richardson P.C.

(57) ABSTRACT

Among other disclosed subject matter, a method includes receiving metric data associated with an execution of each of a plurality of task instances. The plurality of task instances include task instances associated with a task and the metric data for each task instance relating to execution performance of the task instance. The method includes for each task instance determining a deviation of the metric data associated with the task instance relative to an overall deviation of the metric data for the plurality of task instances of the task during each of a plurality of intervals and combining deviation measurements for the task instance that exceed a threshold deviation to obtain a combined deviation value. Each deviation measurement corresponds to the deviation of the metric data for one of the plurality of intervals. The method includes ranking the combined deviation values associated with at least a subset of the task instances.

28 Claims, 4 Drawing Sheets

FIG. 2

| | User | CPI Mean | CPI Standard Deviation | Task |
|---|---|---|---|---|
| 202 → | Platform A | 3.26 | 0.443 | Dictionary |
| 204 → | Platform B | 2.208 | 0.531 | Dictionary |
| | Platform A | 3.873 | 0.416 | Image Processing |
| | Platform C | 1.808 | 0.197 | Data Modeling |

| Score | Host | CPI Mean | CPI Standard Deviation | Task Instance CPI | Index | User | Task |
|---|---|---|---|---|---|---|---|
| 360.1 | HostA | 3.873 | 0.416 | 5.484 | 499 | R | Dictionary |
| 212 | Host12 | 2.037 | 0.276 | 3.895 | 241 | S | Background processing |
| 147.5 | HostB | 2.196 | 0.251 | 3.472 | 1 | D | Image Processing |
| 135.8 | Host 1 | 1.808 | 0.197 | 2.729 | 129 | F | Data Modeling |
| 91.8 | Host Z | 3.873 | 0.416 | 5.532 | 501 | R | Dictionary |

← 400

300

302 —
HOST = HostA
Task = Dictionary
Index = 499
User = R
Mean CPI = 3.873
STD = 0.416
Threshold CPI = 5.247

304 —

| Time | CPI | Score |
|---|---|---|
| 2010-12-22 16:10 | 5.464 | 3.821 |
| 2010-12-22 16:45 | 5.439 | 3.759 |
| 2010-12-22 16:50 | 5.377 | 3.610 |
| 2010-12-22 21:35 | 5.722 | 4.440 |
| 2010-12-22 21:40 | 5.531 | 3.980 |
| 2010-12-22 21:50 | 5.707 | 4.403 |
| 2010-12-22 22:00 | 5.328 | 3.494 |
| 2010-12-22 22:05 | 5.431 | 3.740 |
| 2010-12-22 22:35 | 5.252 | 3.311 |
| 2010-12-23 05:10 | 5.448 | 3.781 |
| 2010-12-23 05:15 | 5.555 | 4.038 |
| 2010-12-23 05:20 | 5.337 | 3.514 |
| 2010-12-23 05:30 | 5.527 | 3.970 |
| 2010-12-23 05:35 | 5.362 | 3.576 |

FIG. 3

IDENTIFYING TASK INSTANCE OUTLIERS BASED ON METRIC DATA IN A LARGE SCALE PARALLEL PROCESSING SYSTEM

BACKGROUND

This document relates to managing task performance.

Systems for large-scale parallel processing can include performing computer tasks and/or processes on a cluster of computers and/or servers (e.g., task parallelism). Each computer in the cluster can perform part of the task by executing one or more task instances. For example, task instances can be performed in parallel on each server within a cluster of servers and can interact with on the same or different data. There can a large number of tasks and task instances. Each task instance executes the same software program. The cluster can include computers that share a common platform, e.g., computers that use the same type of CPU and have identical or nearly identical memory configurations, and can include computers of various platform types. In some cases, multiple servers within a cluster can be implemented on a single physical device. For example, the servers may be implemented as virtual machines, with multiple virtual machines running on a single computer.

Each computer in a cluster can instantiate multiple task instances associated with one or more tasks. As a computer in the cluster performs the tasks defined by the task instances, the task instances can use a common resource, such as the CPU or memory. Because the task instances share common resources, one task instance can interfere with the performance of other task instances executing on the same computer. For example, one task instance can require or use a greater share of the CPU or memory than other task instances and can cause the other task instances on the computer to have increased task latency or increase the number of CPU cycles needed to complete an instruction.

SUMMARY

This specification describes techniques for managing task performance, including identifying poorly performing task instances.

In general, one innovative aspect of the subject matter described in this specification can be embodied in methods that include the actions of: receiving metric data associated with an execution of each of a plurality of task instances, with each task instance including one or more computer-executable instructions, wherein the plurality of task instances are executed on one or more computers, the plurality of task instances include task instances associated with a task, and the metric data for each task instance relating to an execution performance of the task instance; for each task instance: determining a deviation of the metric data associated with the task instance relative to an overall measure of the metric data for the plurality of task instances of the task during each of a plurality of intervals; and combining deviation measurements for the task instance that exceed a threshold deviation to obtain a combined deviation value, wherein each deviation measurement corresponds to the deviation of the metric data for one of the plurality of intervals; ranking the combined deviation values associated with at least a subset of the plurality of task instances to identify an outlier; and generating a report including the ranked combined deviation values.

These and other embodiments can each optionally include one or more of the following features. The overall measure can include a standard deviation associated with the received metric data associated with the task. The standard deviation can be based on cycle per instruction values associated with the plurality of task instances. The threshold deviation can be based on a function of a mean cycle per instruction value associated with the task performed on the one or more computers and the standard deviation. The deviation measurement can be based on the mean cycle per instruction value associated with the task performed on the one or more computers, the standard deviation associated with the task and the metric data associated with the task instance. The one or more computers can include one or more computers of the same platform. The method can also include modifying an execution of a particular task instance executed on a first computer based on the ranking of the combined deviation values. The method can also include providing the report to a user and receiving an input from the user, wherein the input causes an execution of a particular task instance executed on a first computer to be modified and wherein the input is based on the ranking of the combined deviation values.

Particular embodiments of the subject matter described in this specification can be implemented so as to realize one or more of the following advantages. For example, overall performance of a task or computer can be improved by identifying poorly performing tasks or task instances and adjusting the execution of the poorly performing tasks or task instances. For example, a poorly performing task or task instance can be terminated or can be moved to a different computer or platform.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 lists example entries in the database.

FIG. 3 is a portion of an example file including task instances and metric data associated with each task instance.

FIG. 4 is an example performance report.

Like reference symbols in the various drawings indicate like elements.

DETAILED DESCRIPTION

In general, a cluster of computer can perform a plurality of tasks by executing multiple task instances on a cluster of computers in parallel (e.g, task parallelism). Each task instance executes the same software code and can have similar workloads. Each computer collects metric data (i.e., performance metrics) associated with the task instances, e.g, the number of instructions and cycles per instruction ("CPI") used by a task instance to perform a task and cache access and/or memory usage associated with the task instance, and provides the metric data to a metric data engine. The metric data can be monitored or collected as the task instances are performed (e.g., collected on-the-fly) and can be provided to the metric data engine with low latency. The metric data can be provided to the metric data engine via a network connection or other connection. The metric data engine can store the metric data associated with each task instance in a database. For each task performed on a particular platform in the cluster, the metric data engine calculates statistical data based on the metric data for the various task instances that perform the task, e.g., the mean CPI associated with the task and the standard deviation associated with the task. The metric data engine can use the statistical data associated with a task executed on a platform to determine if any of the task instances executed on the platform are performing poorly. For example, an outlier detector can identify task instances with a CPI greater than a threshold value based on the calculated statistical data. A report can be generated listing the task instances having the greatest deviation from the mean CPI of the platform. These poorly performing task instances can be terminated (at least on the current platform or cluster) and/or otherwise adjusted to improve overall performance.

Figure 1:
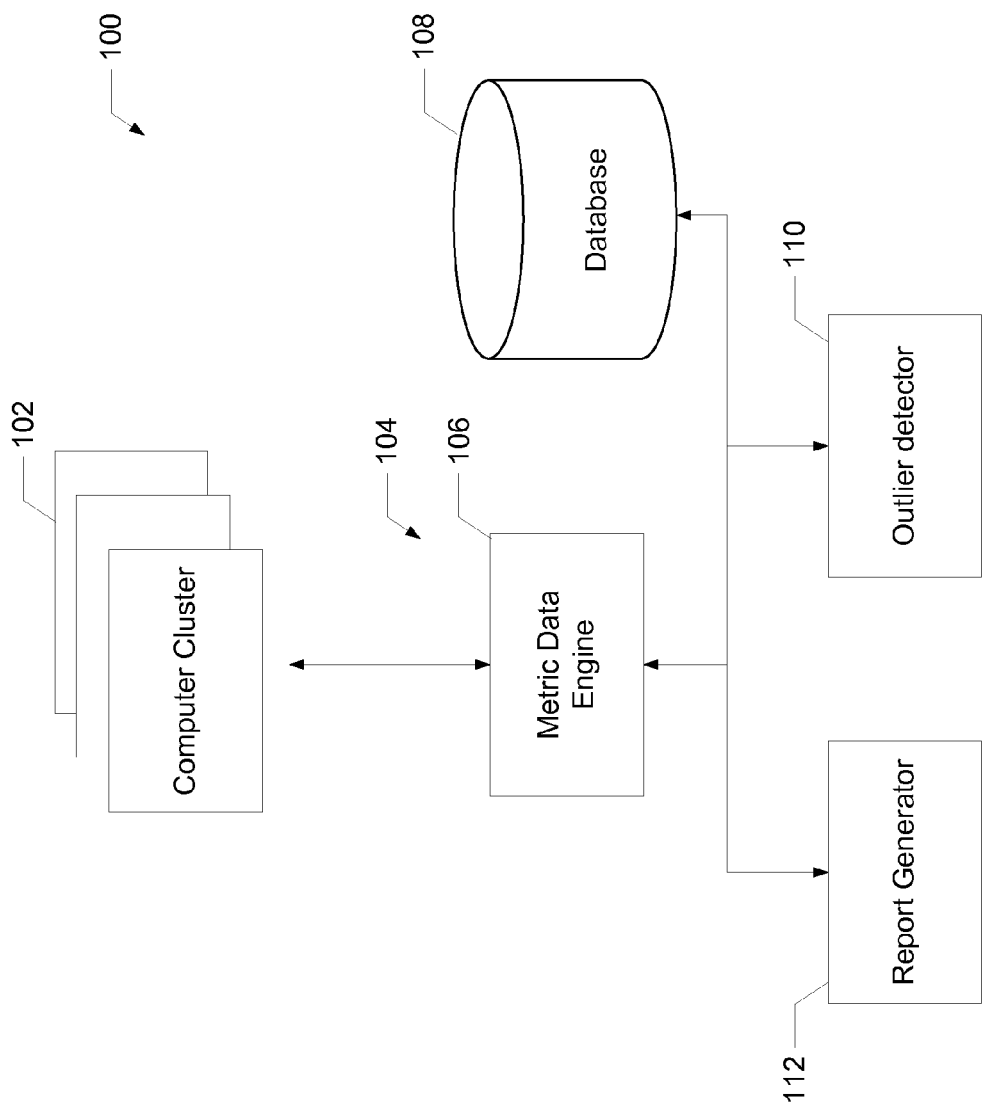
FIG. 1 is a block diagram of an example environment for managing task performance.

FIG. 1 is a block diagram of an example environment 100 for managing task performance. The example environment 100 includes a cluster of computers 102 and a performance analysis engine 104 that includes a metric data engine 106, a database 108, an outlier detector 110, and a report generator 112. The cluster of computers 102 can include multiple computers and/or servers and can include various platform types. For example, cluster 102 can include five computers associated with a first platform type (2 GHz dual core processors and 6 MB level three ("L3") cache), two computers associated with a second platform type (2.6 GHz processor and 8 MB L3 cache) and three servers associated with a third platform type (2.2 GHZ quad core processors and 6 MB L3 cache). For ease of discussion, the term "computer" will be used to include servers and other types of computers. Although FIG. 1 illustrates only one cluster, additional clusters can be included in the environment 100.

The cluster 102 can perform a task that is instantiated in multiple task instances, which can be executed in parallel. For example, cluster 102 can execute a dictionary lookup that is searching for words that include a particular substring and is divided into twenty-six task instances (one task instance for each letter of the alphabet). The twenty-six task instances can be distributed across the computers in the cluster 102 and performed in parallel. Each computer in the cluster 102 can perform multiple task instances associated with the same task.

In addition, the cluster 102 can perform multiple tasks that are each instantiated as multiple parallel task instances. For example, each computer in the cluster 102 can perform dictionary lookup task instances and data modeling task instances.

Each computer in the cluster 102 can include one or more performance counters to measure metric data associated with the computer and the task instances executed on the computer. For example, each computer in the cluster 102 can include a CPU that includes a performance counter. In some implementations, a first performance counter can count the number of instructions performed and a second performance counter can count the CPU cycles used by the computer to execute a task instance. In some implementations, the performance counter can determine the memory usage associated with each task instance (e.g., the number of cache misses and the number of cache references, hereinafter referred to as "cache data") and the amount of time or number of cycles each task instance waits for a memory access. The cache data can be used to calculate a cache hit/miss ratio and/or infer cache occupancy. The performance counter can continuously measure the metric data and provide the metric data associated with each task instance to the performance analysis engine 104. The metric data can be monitored or collected on-the-fly and can be provided to the performance analysis engine 104 via a network connection or other data connection. In some implementations, the performance counter collects metric data and periodically provides the collected metric data to the performance analysis engine 104. Alternatively, the performance counter can store metric data in a memory, and the performance analysis engine 104 can periodically retrieve the metric data from the memory.

The performance analysis engine 104 can include a metric data engine 106, a database 108, an outlier detector and a report generator 112. The metric data engine 106 can receive metric data from the cluster 102. For example, the metric data engine 106 can continuously receive the metric data from the cluster 102 or can periodically receive metric data from each computer in the cluster 102. In some implementations, the metric data engine 106 receives the data from each computer every five minutes. Although, in some implementations, the metric data engine 106 periodically receives the metric data from the cluster 102, each computer in the cluster 102 can continuously collect the metric data.

The metric data engine 106 can store the metric data received from each computer in the cluster 102 in the database 108. The database 108 can be any appropriate type of database or other memory that can be accessed by the metric data engine 106, the outlier detector 110 and/or the report generator 112. In some implementations, the database 108 can store the metric data and organized by time interval associated with the metric data, task instance and the computer that provided the data. The metric data engine 106 can also associate information to uniquely identify a task instance with the metric data associated with the task instance. For example, the metric data engine 106 can store the task name, an index number associated with the task instance and the user that initiated the task corresponding to the task instance.

The metric data engine 106 can use the metric data collected from the cluster 102 to determine statistical data for a particular task executed on a particular platform. For example, the metric data engine 106 can determine the mean CPI and the standard deviation associated with the CPI for dictionary lookup task instances executed on computers having a 2 GHz dual core processor with 4 MB L3 cache. In some implementations, the metric data engine 106 can also determine statistical data associated with the cache usage associated with a particular task executed on a particular platform. The statistical data can be stored in the database 108 and can be associated with an indicator or descriptor that describes the task, the platform type and the time at which the mean CPI was calculated. In some implementations, the metric data engine 106 can calculate other statistical data, such as the mean CPI and/or variance of the metric data.

FIG. 2 illustrates example entries 200 in the database 108. Each row includes the statistical data associated with a particular platform and a particular task. For example, row 202 lists the mean CPI and standard deviation associated with the dictionary lookup task performed on Platform A. Row 204 lists the metric data associated with the dictionary lookup task performed on Platform B. In some implementations, the rows 202 and 204 can include other data such as the mean cache data and/or number of task instances associated with the task executed on the same platform.

The outlier detector 110 can access the database 108 and analyze the metric data to identify tasks or task instances that are performing poorly. For example, the outlier detector 110 can access the database 108 and analyze metric data associated with a data modeling task performed on computers having a 2.5 GHz processor and 6 MB of L3 cache to determine if a task instance is performing poorly. In some implementations, the outlier detector 110 analyzes the CPI associated with a task instance as it is received from the cluster 102 and compares it to a threshold value. The threshold value can be a function of the statistical data, such as the mean CPI and standard deviation, associated with the task performed on the particular platform. For example, the threshold value can be equal to:

Threshold Value=Mean CPI of Task+(3.3*Standard Deviation of the Task's CPI)

It is noted that the values in the above equation (e.g., Mean CPI of Task and Standard Deviation of the Task's CPI) are associated with a particular task and not with a particular task instance. The standard deviation scaling factor (e.g., 3.3) can be decreased or increased to alter the sensitivity for detecting outliers. For example, the scaling factor equal to 3.3 decreases the sensitivity for detecting outliers such that the probability that an outlier exists is approximately 1 in 1000 (based on a normal distribution). The scaling factor can be chosen based on Chebyshev's Inequality, assuming the performance of tasks is a random variable. Other threshold values can be used. For example, the threshold value can be a predetermined number, a ratio of the task instance's CPI to the mean CPI or can be a value greater than a predetermined percentage than the mean CPI, such as 30% greater than the mean CPI. In some implementations, the outlier detector 110 analyzes the cache data associated with a task instance and compares it to a threshold value based on the mean cache data associated with the task executed on the platform.

If the outlier detector 110 determines that a task instance's CPI is greater than the threshold value, the outlier detector 110 can generate a score associated with the task instance. The score can be an indication of how poorly the task instance is performing. Various methods can be used to determine the score associated with the task instance. For example, the outlier detector 110 can generate a score using the task instance's CPI, the mean CPI for the task on the platform, and the standard deviation of the task. In some implementations, the outlier detector 110 can determine the score of a task instance to be:

Score=(CPI Task Instance–Mean CPI)/Standard Deviation of Task's CPI

In some implementations, a poorly performing task instance is associated with a higher score than a task instance that is not performing poorly. The outlier detector 110 can store the score and the metric data associated with the task instance in a file in the database 108 (an "outlier score file"). For example, the outlier detector 110 can store the task instance's CPI, the time stamp associated with the CPI and a score associated with the task instance.

FIG. 3 illustrates a portion of an example outlier score file 300. The outlier score file 300 includes header information 302 and entries 304 associated with task instances having a CPI greater than the threshold value. The header 302 includes information such as the name of the computer that executed the task instance ("Host"), information to uniquely identify the task instance ("Task," "Index" and "User"), the mean CPI for the platform ("Mean CPI"), the standard deviation associated with the task across the platform ("STD") and the threshold value ("Threshold CPI"). In some implementations, the header information 302 is not stored in the outlier score file 300. Instead, the header information is maintained in a separate file that includes header information for each task instance performed on the platform. Each entry 304 includes the time stamp associated with the task instance's CPI measurement, the CPI measurement collected by the Host, and the score generated by the outlier detector 110. In some implementations, the entries 304 also include other metric data associated with the task instance, such as the cache data. Each time the outlier detector 110 determines that the task instance's CPI exceeds the threshold value, the outlier detector 110 can update the outlier score file 300 to include the new data sample and the score associated with the task instance.

After receiving an instruction to generate a report, the report generator 112 can access the database 108 and analyze the outlier score files created by the outlier detector 110. For each outlier score file, the report generator 112 can generate an overall score associated with the task instance. For example, the report generator 112 can determine the overall score associated with the task instance to be the sum of the scores included in the outlier score file such that poorly performing task instances are associated with overall scores greater than a task instance that is not poorly performing. Other methods to calculate the overall score can be used. In some implementations, the report generator 112 can adjust the overall score by various factors such as the number of entries included in the outlier score file and the time intervals between consecutive entries in the outlier score file.

The report generator 112 can compare the overall scores to identify the task instances that are the poorest performing tasks. For example, the report generator 112 can determine the three worst performing task instances by analyzing the overall scores associated with each outlier score file and identifying the three task instances with the three highest overall scores. The report generator 112 can generate a report that lists the worst performing task instances.

For example, FIG. 4 illustrates an example report 400 created by the report generator 112. The report 400 lists the five worst performing task instances. For example, report 400 lists the dictionary task as the task instance with the worst performance (i.e., the task instance with the largest overall score). For each task instance included in the report 400, the report 400 can list the task instance's overall score, the name of the computer performing the task instance, the mean CPI associated with the task executed on the platform, the standard deviation associated with the task executed on the platform, the task instance' most recent CPI, and data to uniquely identify the task instance. In some implementations, the report 400 can also include other metric data associated with the task instances, such as the cache data or time/cycles spent waiting for a memory access.

The report generator 112 can provide the report to a user, such as a system administrator or a network administer. The user can analyze the report and take actions to improve the cluster's performance, the platform's performance, the computer's performance or the task's performance. For example, the user can relocate a task instance with the highest overall score and allow the task instance to be performed on a different computer or a different cluster. As another example, the user can analyze the report to determine which task instance has the greatest cache data and relocate that task instance. In some implementations, the user can identify the task instance (s) that are causing the performance problem and terminate or relocate these task instances.

In some implementations, the performance analysis engine 104 can access the report generated by the report generator and automatically terminate the worst performing task instance. Similarly, in some implementations, the performance analysis engine 104 can analyze the report and terminate the task instance having the greatest CPU or cache data.

Figure 5:
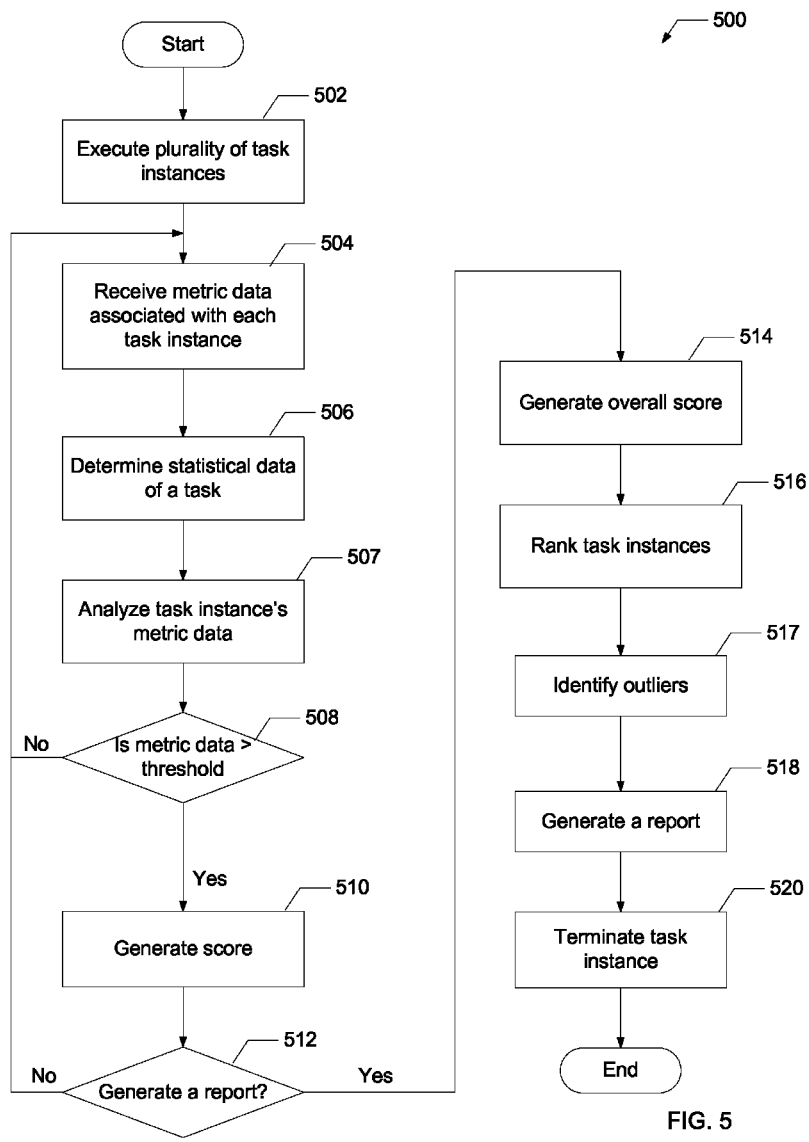
FIG. 5 is an illustration of an example process for managing task performance.

FIG. 5 is an illustration of an example process 500 for managing task performance. At 502, a plurality of task instances is executed on a cluster of computers. For example a task, such as a dictionary lookup or data modeling, can be divided into a plurality of task instances and executed in parallel on a cluster of computers 102. The cluster of computers 102 can include computers associated with different platforms. As the cluster 102 performs the task instances, each computer collects metric data associated with each task instance. For example, each computer can record the CPI and cache access associated with each task instance executed by the computer. The metric data can be collected as the task instances are performed (e.g., collected on-the-fly) and can be provided to the metric data engine with low latency. In some implementations, the metric data can be collected at predefined time periods, continuously collected or collected at other appropriate times.

At 504, the performance analysis engine 104 receives the metric data associated with each task instance performed on a platform. For example, the metric data engine 106 can receive the metric data associated with each task instance from a particular platform type in the cluster 102. For example, each computer in the cluster 102 having a 2 GHz processor and a 6 MB L3 cache (hereinafter referred to as "Platform A") and executing an instance of the Dictionary lookup task can send metric data associated with dictionary lookup task instances to the metric data engine 106. The metric data can include data such as the task instance's CPI and the cache or CPU usage associated with the task instance. The metric data engine 106 can store the collected metric data, information identifying the task instance (e.g., the Index number, the User and the task name) and information identifying the computer performing each task instance (e.g., Host name) in the database 108.

At 506, the metric data engine determines the statistical data associated with a task executed on a particular platform. For example, the metric data engine 106 can access the database 108 and analyze the metric data associated with each dictionary task instance performed on Platform A and determine the mean CPI and standard deviation of the dictionary task. In some implementations, the metric data engine 106 can calculate other statistical data, such as the median CPI. The metric data engine 106 can store the calculated statistical data in the database and include information identifying Platform A and the task instance associated with the statistical data.

At 507, the outlier detector analyzes the metric data associated with each task instance executed on Platform A. In some implementations, the outlier detector 110 analyzes the most recently collected CPI associated with a task instance and compares it to a threshold value (at 508). The threshold value can be a function of the statistical data associated with the task performed on the particular platform. For example, the threshold value can be equal to:

Threshold value=mean CPI of Task+(3.3*Standard Deviation of the Task's CPI)

Other appropriate threshold values can be used.

If the task instance's metric data is not greater than the threshold value, the process returns to 504 and additional metric data is collected from the cluster (at 508). If the task instance's metric data is greater than the threshold value, the outlier detector generates a score associated with the task instance (510). For example, the outlier detector 110 can generate a score using a function of the metric data associated with the task instance and the statistical data associated with Platform A. In some implementations, the outlier detector 110 generates a score based on the task instance's CPI, the mean CPI for the task on Platform A, and the standard deviation of the task on Platform A. For example, the outlier detector 110 can generate a score using the following formula:

Score=(CPI task instance−Mean CPI)/Standard Deviation of Task's CPI

The outlier detector 110 can also store the score, the task instance's metric data and the time stamp associated with the metric data in an outlier score file associated with the task instance. FIG. 3 provides an example outlier score file. The outlier detector 110 can store the outlier score file in the database 108.

If a report is requested (at 512), the process 500 continues and generates an overall score for each task instance (at 514). For example, the report generator 112 can access the database 108 and analyze each outlier score file to generate an overall score for each task instance. In some implementations, the report generator 112 can generate a task instance's overall score based on the sum of the scores included in the outlier score file. If a report is not requested, the process 500 returns to 504 and additional metric data is collected.

The report generator 112 can rank the task instances based on the task instances' performance (at 516). For example, the report generator 112 can rank the task instances based on the overall scores. In some implementations, the task instances with larger overall scores (i.e., poorly performing task instances) are ranked higher than task instances with smaller overall scores.

After the task instances are ranked, outliers can be identified (at 517). For example, the report generator 112 can identify the task instance with the largest overall score as an outlier. In some implementations, the report generator 112 can identify a predetermined number of outliers. For example, the report generator 112 can identify the three task instances with the largest overall scores as the outliers. The report generator 112 then generates a report that includes the overall scores and the identified outliers (at 518).

The report is analyzed and a task instance can be relocated (at 520). For example, the task instance can be executed on a different computer in the cluster or in a computer in a different cluster (at 520). For example, the report can be provided to a user, such as a system administrator or network administrator. After reviewing the report, the user can relocate the task instance with the largest overall score or can otherwise adjust resources to improve the computer's performance. In some implementations, the report can be reviewed by the performance analysis engine 104, which can relocate the task instance with the largest overall score. In some implementations, the task instance with the largest CPU or cache access is relocated.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, performance analysis engine can filter the metric data received from the cluster by removing potentially unreliable metric data (e.g., data representing low CPU usage or metric data that is extremely high or low). For example the performance analysis engine can compare the metric data to predetermined parameters (e.g., CPU usage thresholds) that indicate the metric data is potentially unreliable. As another example, the threshold value can be based on a weighted average or a piecewise linear function. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method comprising:
    receiving, for each of a plurality of task instances that execute one or more computer-executable instructions to perform a task, a plurality of performance measures that each represent an execution performance of a property of the respective task instance for a particular time interval, wherein the plurality of task instances are executed in parallel on one or more computers;
    for each task instance:
        determining, for each performance measure of the respective task instance, whether the respective performance measure exceeds a threshold value that is based on a function of a mean and a standard deviation of the performance measure that represent the same property as the respective performance measure;
        determining, for each of the performance measures that exceeds the threshold value, a score using the respective performance measure and a mean and a standard deviation of the performance measures that represent the same property as the respective performance measure; and
        combining the scores for the performance measure that represent the execution performance measure of the same property of the respective task instance to obtain a combined score value;
    ranking the combined score values associated with at least a subset of the plurality of task instances to identify an outlier; and
    terminating an execution of a particular task instance on a first computer and executing the particular task instance on a second computer different from the first computer based on the ranking of the combined score values, the particular task instance from the plurality of task instances.

2. The computer-implemented method of claim 1 wherein the property comprises cycles per instruction and the standard deviation is based on cycles per instruction values associated with the plurality of task instances.

3. The computer-implemented method of claim 2 wherein the property comprises mean cycles per instruction and the threshold value is based on a function of a mean cycles per instruction value associated with the task performed on the one or more computers and the standard deviation.

4. The computer-implemented method of claim 1 wherein the property comprises mean cycles per instruction and determining, for each of the performance measures that exceeds the threshold value, the score using the respective performance measure and the mean and the standard deviation of the performance measures that represent the same property as the respective performance measure comprises determining the score using a mean cycles per instruction value associated with the task performed on the one or more computers, the standard deviation associated with the task, and the respective performance measure associated with the task instance.

5. The computer-implemented method of claim 1 wherein the one or more computers comprises one or more computers of the same hardware platform.

6. The computer-implemented method of claim 1, further comprising:
    modifying an execution of a second particular task instance executed on the first computer based on the ranking of the combined score values, the second particular task instance from the plurality of task instances.

7. The computer-implemented method of claim 1, further comprising:
    generating a report including the ranked combined score values;
    providing the report to a user; and
    receiving, in response to providing the report to the user, an input from the user, wherein the input causes an execution of a second particular task instance executed on a first computer to be modified, the second particular task instance from the plurality of task instances.

8. The computer-implemented method of claim 1, wherein the property comprises a number of cycles per instruction and the performance measure includes data indicating a number of cycles per instruction for each task instance during the particular time interval.

9. The computer-implemented method of claim 1, further comprising:
    filtering, before determining whether the respective performance measure exceeds the threshold value that is based on the function of the mean and the standard deviation of the performance measure that represent the same property as the respective performance measure, the performance measures based on predetermined parameters that identify potentially unreliable measurements.

10. The computer-implemented method of claim 9, wherein the filtering comprises removing performance measures that indicates low CPU usage.

11. The method of claim 1, comprising normalizing each of the combined score values, wherein ranking the combined score values comprises ranking the normalized combined score values.

12. The method of claim 11, wherein normalizing each of the combined score values comprises normalizing the combined score value using a quantity of the scores for the performance measure that represent the execution performance measure of the same property of the respective task instance.

13. A system, comprising:
    memory; and
    one or more processors coupled to the memory and configured to perform operations comprising:
        receiving, for each of a plurality of task instances that execute one or more computer-executable instructions to perform a task, a plurality of performance measures that each represent an execution performance measure of a property of the respective task instance for a particular time interval, wherein the plurality of task instances are executed in parallel on one or more computers;
        for each task instance:
            determining, for each performance measure of the respective task instance, whether the respective performance measure exceeds a threshold value that is based on a function of a mean and a standard deviation of the performance measure that represent the same property as the respective performance measure;
            determining, for each of the performance measures that exceeds the threshold value, a score using the respective performance measure and a mean and a standard deviation of the performance measures that represent the same property as the respective performance measure; and
            combining the scores for the performance measure that represent the execution performance measure of the same property of the respective task instance to obtain a combined score value;
        ranking the combined score values associated with at least a subset of the plurality of task instances to identify an outlier; and
        terminating an execution of a particular task instance on a first computer and executing the particular task instance on a second computer different from the first computer based on the ranking of the combined score values, the particular task instance from the plurality of task instances.

14. The system of claim 13 wherein the property comprises cycles per instruction and the standard deviation is based on cycles per instruction values associated with the plurality of task instances.

15. The system of claim 14 wherein the property comprises mean cycles per instruction and the threshold value is based on a function of a mean cycles per instruction value associated with the task performed on the one or more computers and the standard deviation.

16. The system of claim 13 wherein the property comprises mean cycles per instruction and determining, for each of the performance measures that exceeds the threshold value, the score using the respective performance measure and the mean and the standard deviation of the performance measures that represent the same property as the respective performance measure comprises determining the score using a mean cycles per instruction value associated with the task performed on the one or more computers, the standard deviation associated with the task, and the respective performance measure associated with the task instance.

17. The system of claim 13 wherein the one or more computers comprises one or more computers of the same hardware platform.

18. The system of claim 13 wherein the one or more processors are configured to perform operations further comprising:
    modifying an execution of a second particular task instance executed on the first computer based on the ranking of the combined score values, the second particular task instance from the plurality of task instances.

19. The system of claim 13 wherein the one or more processors are configured to perform operations further comprising:
    generating a report including the ranked combined score values and the outlier;
    providing the report to a user; and
    receiving, in response to providing the report to the user, an input from the user, wherein the input causes an execution of a second particular task instance executed on a first computer to be modified, the second particular task instance from the plurality of task instances.

20. The system of claim 13 wherein the property comprises a number of cycles per instruction and the performance measure includes data indicating a number of cycles per instruction for each task instance during the particular time interval.

21. The system of claim 13 wherein the one or more processors are configured to perform operations further comprising:
    generating a report including the ranked combined score values and the outlier.

22. A non-transitory computer readable medium encoded with a computer program comprising instructions that, when executed, operate to cause a computer to perform operations:
    receive, for each of a plurality of task instances that execute one or more computer-executable instructions to perform a task, a plurality of performance measures that each represent an execution performance measure of a property of the respective task instance for a particular time interval, wherein the plurality of task instances are executed in parallel on one or more computers;
    for each task instance:
        determine, for each performance measure of the respective task instance, whether the respective performance measure exceeds a threshold value that is based on a function of a mean and a standard deviation of the performance measure that represent the same property as the respective performance measure;
        determine, for each of the performance measures that exceeds the threshold value, a score using the respective performance measure and a mean and a standard deviation of the performance measures that represent the same property as the respective performance measure; and
        combine the scores for the performance measure that represent the execution performance measure of the same property of the respective task instance to obtain a combined score value;
    rank the combined score values associated with at least a subset of the plurality of task instances to identify an outlier; and
    terminating an execution of a particular task instance on a first computer and executing the particular task instance on a second computer different from the first computer based on the ranking of the combined score values, the particular task instance from the plurality of task instances.

23. The computer readable medium of claim 22 wherein the property comprises cycles per instruction and the standard deviation is based on cycles per instruction values associated with the plurality of task instances.

24. The computer readable medium of claim 23 wherein the property comprises mean cycles per instruction and the threshold value is based on a function of a mean cycles per instruction value associated with the task performed on the one or more computers and the standard deviation.

25. The computer readable medium of claim 22 wherein the property comprises mean cycles per instruction and the operations to determine, for each of the performance measures that exceeds the threshold value, the score using the respective performance measure and the mean and the standard deviation of the performance measures that represent the same property as the respective performance measure comprises determining the score using a mean cycles per instruction value associated with the task performed on the one or more computers, the standard deviation associated with the task, and the respective performance measure associated with the task instance.

26. The computer readable medium of claim 22 further comprising instructions that, when executed, operate to cause a computer to perform operations:

modify an execution of a second particular task instance executed on a first computer based on the ranking of the combined score values, the second particular task instance from the plurality of task instances.

27. The computer readable medium of claim 22 further comprising instructions that, when executed, operate to cause a computer to perform operations:

generate a report including the ranked combined score values;

provide the report to a user; and receive, in response to providing the report to the user, an input from the user, wherein the input causes an execution of a second particular task instance executed on a first computer to be modified, the second particular task instance from the plurality of task instances.

28. The computer readable medium of claim 22, further comprising normalizing each of the combined score values, wherein ranking the combined score values comprises ranking the normalized combined score values.

* * * * *